(12) United States Patent
So et al.

(10) Patent No.: US 7,111,773 B1
(45) Date of Patent: Sep. 26, 2006

(54) DAMPED, MECHANICALLY DRIVEN LID FOR A HANDHELD DEVICE

(75) Inventors: Yuet Leung So, Aberdeen (HK); Surjit Paul Singh Soni, Pasadena, CA (US)

(73) Assignee: Sun Coast Merchandise Corporation, Commerce, CA (US)

( * ) Notice: Subject to any disclaimer, the term of this patent is extended or adjusted under 35 U.S.C. 154(b) by 472 days.

(21) Appl. No.: 09/948,449

(22) Filed: Sep. 7, 2001

(51) Int. Cl.
G06F 15/02 (2006.01)
G06M 1/02 (2006.01)
H01H 13/702 (2006.01)
(52) U.S. Cl. .............................. 235/1 D; 379/433.13
(58) Field of Classification Search ............. 235/1 D; 16/52, 54, 82, 271, 303, 306, 340; 361/683, 361/681; 379/433.13, 33.13; 455/90.1
See application file for complete search history.

(56) References Cited

U.S. PATENT DOCUMENTS

| | | | |
|---|---|---|---|
| 3,118,167 A | 1/1964 | Morris et al. | |
| 3,860,993 A | 1/1975 | Matuska | |
| 3,881,807 A | 5/1975 | Hosokawa et al. | |
| 3,952,365 A | 4/1976 | Grisebach | |
| D249,822 S | 10/1978 | Ohie et al. | |
| 4,259,568 A | 3/1981 | Dynesen | |
| 4,290,168 A | 9/1981 | Binge | |
| 4,390,289 A | 6/1983 | Houlihan | |
| 4,426,752 A | 1/1984 | Nakayama | |
| 4,703,160 A | 10/1987 | Narishima | |
| 4,796,733 A | 1/1989 | Nakayama | |
| 4,803,560 A * | 2/1989 | Matsunaga et al. | 348/794 |
| 4,820,908 A | 4/1989 | Wei | |
| 4,893,522 A | 1/1990 | Arakawa | |
| 4,989,926 A | 2/1991 | Snow, Jr. | |
| 5,109,571 A * | 5/1992 | Ohshima et al. | 16/307 |
| 5,128,829 A | 7/1992 | Loew | |
| 5,142,738 A | 9/1992 | Ojima | |

(Continued)

FOREIGN PATENT DOCUMENTS

JP 57-143626 9/1982

(Continued)

OTHER PUBLICATIONS

PC-133: Foldable Desk Top Reminder Calculator. Description sheet [online]. Prod-Art Co. Ldt. [Retrieved on Sep. 5, 2001]. Retrieved from the Internet: <http://www.prodart.com.hk/flashindex.html?calculatorlist.html>.

(Continued)

Primary Examiner—Michael G. Lee
Assistant Examiner—Kumiko C. Koyama
(74) Attorney, Agent, or Firm—The Soni Law Firm; Stephen T. Bang

(57) ABSTRACT

A lid and lid drive mechanism for a portable, hand held device pivots a flat cover on the device in a predetermined controlled manner between a first position covering at least portion of the front of the device and a second position in which the cover extends towards the rear of the device. The drive mechanism comprises a spring/damper mechanism which pivots the cover of the device in a predetermined controlled manner between the first position and the second, thus forming a stand raising the top end of the device above a horizontal support surface upon which it rests. The top end of the device frame has left and right inwardly facing extension which enclose a first and second cylindrical hollow cavities. A coiled drive spring is located in one hollow cavity which a damping mechanism utilizing a damping drum and a viscous fluid is located in the second hollow cavity.

5 Claims, 4 Drawing Sheets

U.S. PATENT DOCUMENTS

| | | | |
|---|---|---|---|
| 5,165,507 A | | 11/1992 | Ohshima |
| 5,222,260 A | * | 6/1993 | Piper ........................ 4/246.1 |
| 5,230,159 A | | 7/1993 | Lipsey |
| 5,239,731 A | | 8/1993 | Lu |
| 5,303,291 A | | 4/1994 | Takagi et al. |
| 5,335,273 A | | 8/1994 | Takagi et al. |
| 5,530,234 A | | 6/1996 | Loh et al. |
| 5,555,157 A | | 9/1996 | Moller et al. |
| 5,568,358 A | | 10/1996 | Nelson et al. |
| 5,607,054 A | | 3/1997 | Hollingsworth |
| 5,628,089 A | | 5/1997 | Wilcox et al. |
| 5,649,309 A | | 7/1997 | Wilcox et al. |
| 5,732,135 A | | 3/1998 | Weadon et al. |
| 5,737,183 A | | 4/1998 | Kobayashi et al. |
| 5,828,587 A | | 10/1998 | Bedol |
| 5,881,150 A | | 3/1999 | Persson |
| D426,849 S | | 6/2000 | Lee |
| 6,085,384 A | | 7/2000 | Bivens |
| 6,115,328 A | | 9/2000 | Chan |
| 6,128,265 A | * | 10/2000 | Leung ........................ 369/75.1 |
| 6,178,085 B1 | | 1/2001 | Leung |
| 6,195,431 B1 | * | 2/2001 | Middleton ............. 379/433.13 |
| 6,446,376 B1 | * | 9/2002 | Chan ............................ 40/721 |
| 6,493,542 B1 | * | 12/2002 | Frohlund ..................... 455/90 |

FOREIGN PATENT DOCUMENTS

| | | |
|---|---|---|
| JP | 60-155225 | 4/1987 |
| JP | 62-63682 | 9/1988 |
| JP | 62-175210 | 1/1989 |
| JP | 2-235660 | 4/1992 |
| JP | 3058706 | 3/1999 |

OTHER PUBLICATIONS

PC-200EC: Foldable Euro Conversion Calculator. Description sheet [online]. Prod-Art Co. Ldt. [Retrieved on Sep. 5, 2001]. Retrieved from the Internet: <http://www.prodart.com.hk/flashindex.html?calculatorlist.html>.

PC-202ECD: Foldable Euro Conversion Calculator. Description sheet [online]. Prod-Art Co. Ldt. [Retrieved on Sep. 5, 2001]. Retrieved from the Internet: <http://www.prodart.com.hk/flashindex.html?calculatorlist.html>.

PC-212ECD: Foldable 11 Euro Countries Conversion Calculator Description sheet [online]. Prod-Art Co. Ldt. [Retrieved on Sep. 5, 2001]. Retrieved from the Internet: <http://www.prodart.com.hk/flashindex.html?calculatorlist.html>.

PC-82ECD: Desk Top Tilt Angle Euro Conversion Calculator Description sheet [online]. Prod-Art Co. Ldt. [Retrieved on Sep. 5, 2001]. Retrieved from the Internet: <http://www.prodart.com.hk/flashindex.html?calculatorlist.html>.

PC-82ECD: Desk Top Tilt Angle Euro Conversion Calculator . Description sheet [online]. Prod-Art Co. Ldt. [Retrieved on Sep. 5, 2001]. Retrieved from the Internet: <http://www.prodart.com.hk/flashindex.html?calculatorlist.html>.

PC-88: 8-Digit Desk Top Battery Calculator. Description sheet [online]. Prod-Art Co. Ldt. [Retrieved on Sep. 5, 2001]. Retrieved from the Internet: <http://www.prodart.com.hk/flashindex.html?calculatorlist.html>.

PC-92EC: Metal Shield Tilt Angle Euro Conversion Calculator. Description sheet [online]. Prod-Art Co. Ldt. [Retrieved on Sep. 5, 2001]. Retrieved from the Internet: <http://www.prodart.com.hk/flashindex.html?calculatorlist.html>.

PC-92ECD: Metal Shield Tilt Angle Euro Conversion Calculator. Description sheet [online]. Prod-Art Co. Ldt. [Retrieved on Sep. 5, 2001]. Retrieved from the Internet: <http://www.prodart.com.hk/flashindex.html?calculatorlist.html>.

* cited by examiner

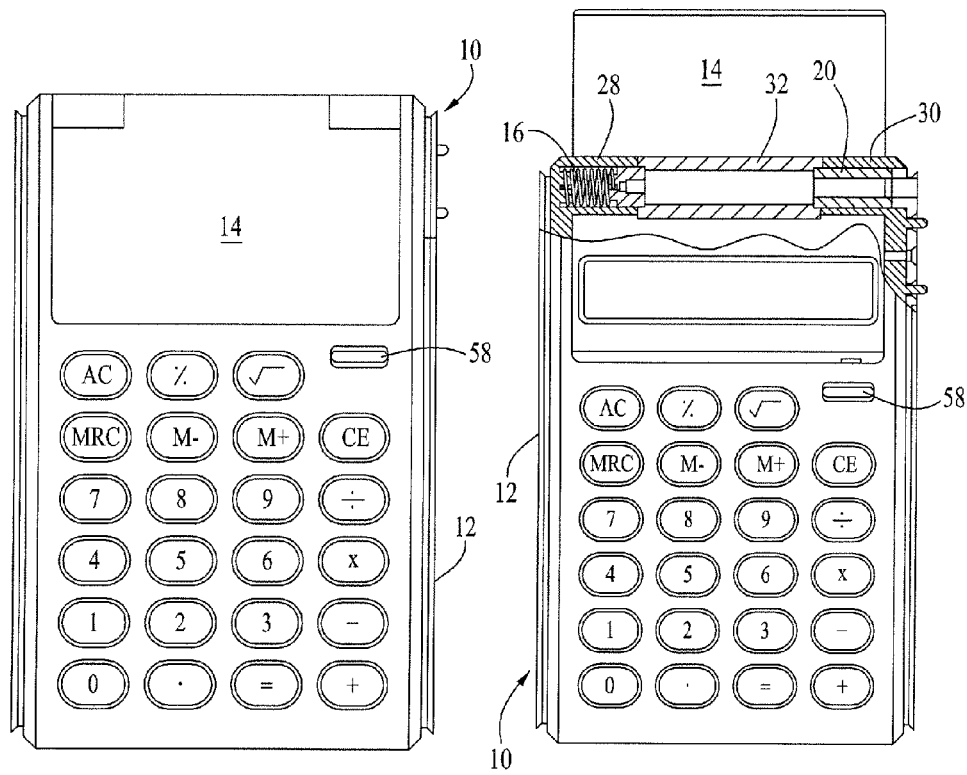
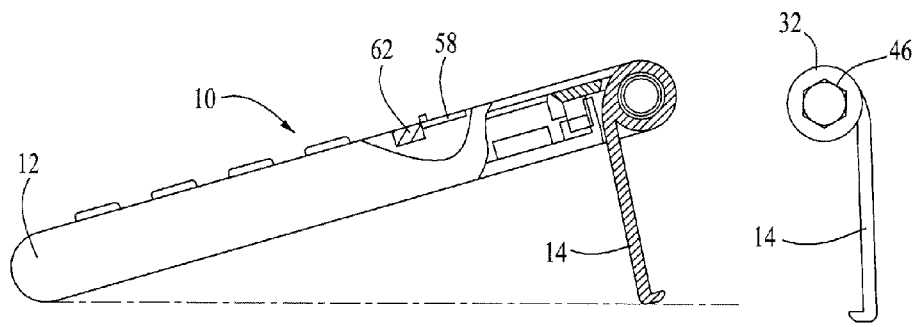

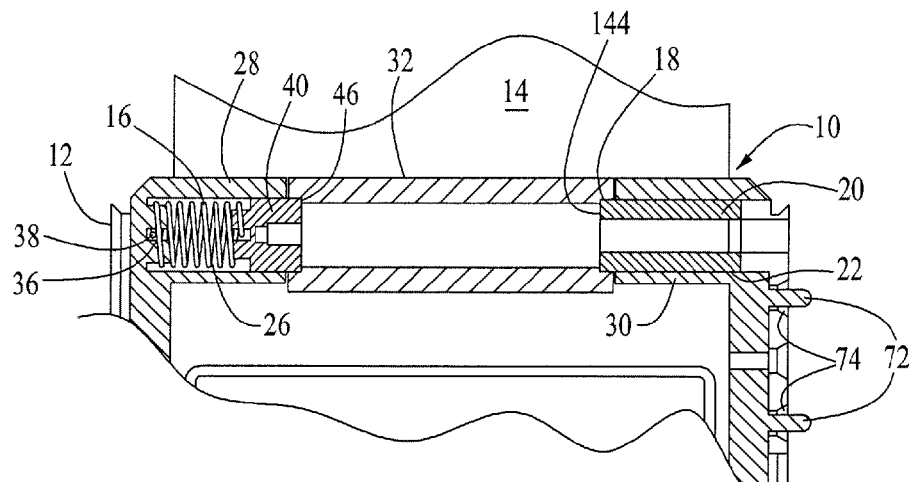
FIG. 5
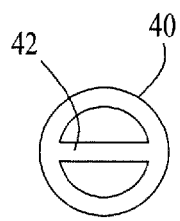 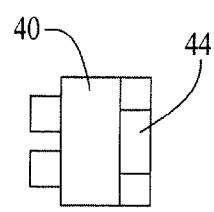 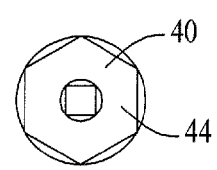
FIG. 7      FIG. 6      FIG. 8
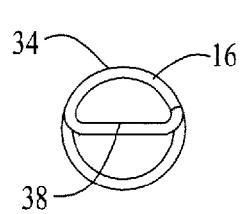 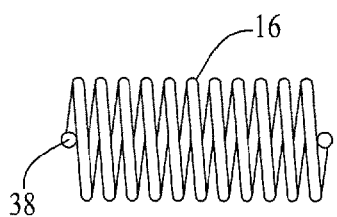
FIG. 9      FIG. 10

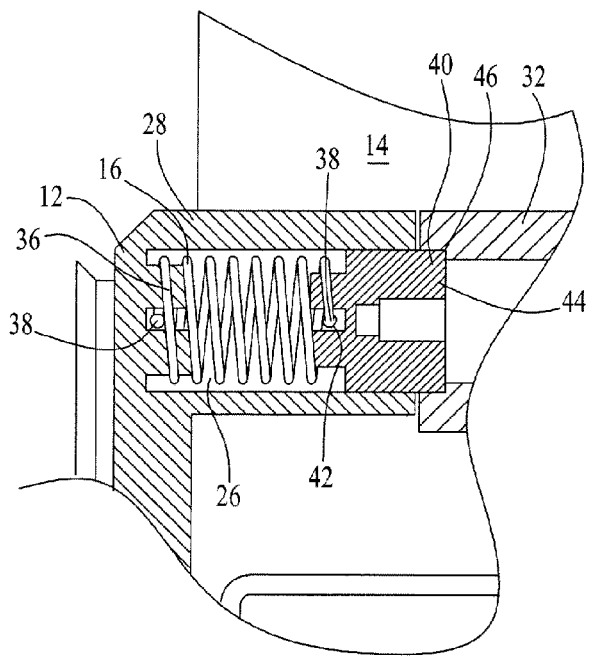
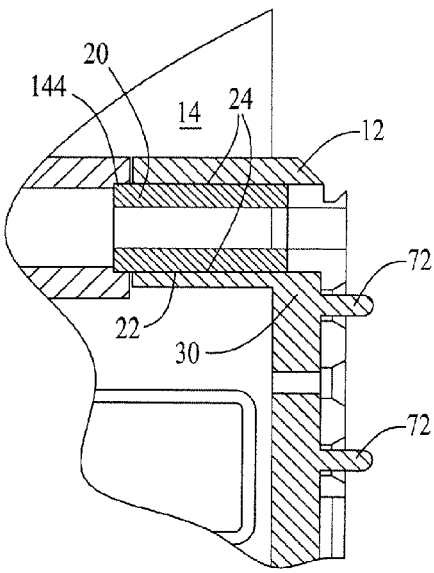
fig.11    fig.12
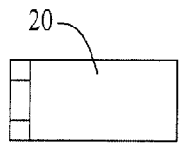 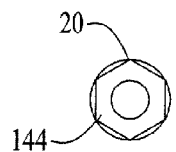 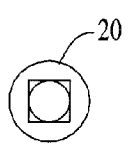
fig.13    fig.14    fig.15
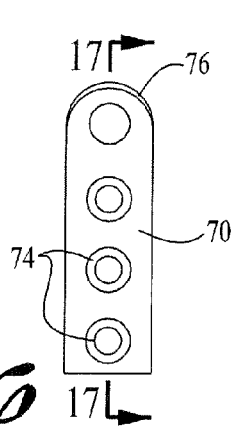 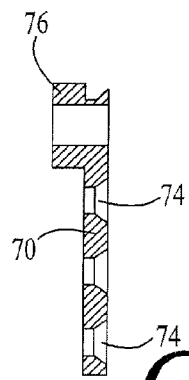
fig.16    fig.17

DAMPED, MECHANICALLY DRIVEN LID FOR A HANDHELD DEVICE

The present invention relates to a lid and lid drive mechanism for a portable, hand held device. The mechanism pivots a flat cover on the device in a predetermined controlled manner between a first position covering at least portion of the front of the device and a second position in which the cover extends towards the rear of the device. In the lids open position it can form a stand for tilting the device into an upwardly inclined position relative to a horizontal support surface upon which it may be placed. While the description relates primarily to the use of the lid to cover the display on a calculator it has application to a numerous different devices wherein it is desirable to protect operative features of the device when it is not in use.

BACKGROUND

U.S. Pat. No. 6,178,085 shows a calculator with a lid hinged to an upper end of the calculator housing. When the calculator is in its stored configuration the lid lays flat over a display panel located in the front surface of the calculator. Upon releasing the lid from its stored position, the lid pivots rearwardly in a controlled, damped manner about a hinge connection between the lid and the calculator frame. The pivoting motion is driven by a torsion spring and damping drum arrangement located within a tubular bore within the hinge portion of the lid.

Des 426,849 to Lee shows a calculator, similar in outward appearance to the '085 patent. However, since it is a design patent the mechanical features of the opening mechanism is not shown.

Hollingsworth, U.S. Pat. No. 5,607,054 discloses a carrying case for a notebook computer having a front panel adapted to be folded rearwardly to form a stand to support the notebook computer in an inclined position.

Nelson, et al., U.S. Pat. No. 5,568,358 discloses a portable signal processing communications unit having a hinged cover which can be folded to form an inclined supporting structure for maintaining the unit in a upwardly tilted position during use when located on a horizontal supporting surface. Nelson includes a helical coil spring in a cylindrical bore in the lid but does not include a damping means Loh, et al., U.S. Pat. No. 5,530,234 discloses a hand held calculator with a cover adapted to extend over the entire front surface of the calculator when the calculator is not in used. When the calculator is used, the cover is slid towards one end of the calculator along longitudinal side grooves in the calculator housing. The cover can then be rotated so it extends below the rear of the calculator to form a stand or support.

Narishima, et al., U.S. Pat. No. 4,703,160 shows a casing structure on a portable electronic appliance, such as a small hand held portable calculator, wherein portions of the casing are hinged to each other so they can be folded backwardly in order to form a supporting stand for maintaining the calculator or device in an inclined or tilted position during use on a support surface Dynesen, U.S. Pat. No. 4,259,568 discloses a portable or pocket calculator having a casing structure including hinged cover. The cover portions are adapted to be folded rearwardly when the calculator is placed on a horizontal surface, providing a stand.

JP57-143626 to Murakami shows a calculator with a pivoting lid that serves as a cover as well as a stand. The helical coil spring in a cylindrical bore in the assembly appears to provide a friction damping function. However, it appears that the lid must be manually rotated about the hinge.

U.S. Pat. No. 4,390,289 to Houlihan show an elastomeric washer in a cylindrical bore along with a tightening screw. The lid can be manually rotated rearwardly up to about 350° to allow the device to stand on a surface at any desired angle to that surface.

U.S. Pat. No. 5,732,135 to Weadon et al—Shows a hinge configuration for a lid on a portable telephone. The housing has a pair of openings to receive movable pins mounted in a tubular portion of the lid. A coil spring in the tubular portion provides friction on the pins.

Many attempts been made to develop devices capable of properly moderating the movement of a lid, causing the lid, on release from its closed position, to be opened smoothly yet steadily and slowly. These devices typically make use of mechanical frictional force and incorporate rods in cylinders filled with oil.

U.S. Pat. No. 6,085,384 to Bivens shows a hinge damper comprising a blind cylindrical bore with a damping drum in that bore and a damping means within the cylindrical bore, that damping means being a viscous silicone oil or other viscous damping fluid or gel. The hinge arrangement is in a channel across the end of a lid or door that is pivotally attached to a stationary structure.

U.S. Pat. No. 3,118,167 shows a hinged structure with a cylinder formed integral with a longitudinal edge. A spindle is disposed coaxially within the bore of the cylinder. The space between the cylinder and the spindle is filled with a fluid-damping medium. A coil spring is located on the spindle so that it drives the hinge in one direction (closed), its torsional force being moderated by the fluid-damping medium.

U.S. Pat. No. 3,860,993 to Matuska is directed to a door opener that biases a door to an open position using a coiled spring with the opening action dampened by a viscous fluid. The device comprises a tubular portion extending along the longitudinal axis thereof with damping means in a cylindrical bore. The damping means comprising a helical coil spring in the bore, one end of the spring being secured against rotation to a bottom surface of the bore, and a damping drum connected to the opposite end of the spring. An enclosed space between the rotor and the inner wall of the cylinder is filled with a viscous silicone that damps the opening action of the spring.

U.S. Pat. No. 5,142,738 shows a still further example of a damped hinge. comprising a case with a rotatable cylinder therein, a high viscosity grease in a gap between the case and the rotatable cylinder A coil spring is mounted between the case and the rotatable cylinder.

U.S. Pat. No. 5,165,507 is yet another example of a hinge construction incorporating a cylindrical case, a damping drum, a coil driving spring and a viscous damping fluid.

U.S. Pat. No. 5,230,159 shows a calculator mounted to the surface of a tape measure. The calculator includes ribbed gripping surfaces 54, 56 along the outer edges of the housing.

In addition, numerous small electronic devices have been available for several years that include a hinged lid with a drive mechanism to open the lid once a latch is released. For example, Prodart of Hong Kong has offered various small calculators that include various pivoting portions, including covers and displays, which include a coil spring drive mechanism to effect opening. However, the damped drive is provided by a gear mechanism operatively attached to the lid. Several of these devices have a coil spring drive enclosed within a tubular portion at the hinged edge of the movable portion.

SUMMARY

The invention contemplates an improved dampened drive construction for the lid on an electronic device such as a calculator. The device has a generally flat surface including buttons for inputting data or operational instructions, electronics for manipulating the input data or instructions, a display window for viewing the information entered, the calculated results or information received or desired to be displayed, and a cover, which covers at least the display window, pivotally mounted to the calculator frame. A spring/ damper mechanism pivots the cover of the device in a predetermined controlled manner between first position overlying the display window and a second position in which the cover extends to the rear of the device, thus forming a stand raising the top end of the device above a horizontal support surface upon which it rests. Upon releasing the lid from its first position, the spring drives the lid around pivot points, to its second position. The damping mechanism moderates the speed of the pivoting movement of the lid. The upper end of the device frame includes two tubular channels spaced apart along a common axis with a hinge portion of the lid located in the space between the channels. The spring is located in one of the tubular channels in the frame, with a first end of the spring attached to the bottom of the channel. The damping mechanism, in a preferred embodiment, has a first end located in the other tubular channel. Both the spring and the damping mechanism have a second end attached to the hinge portion of the lid.

DRAWINGS

These and other features, aspects and advantages of the present invention will become better understood with reference to the following description, appended claims, and accompanying drawings, where:

FIG. 1 is a front view of a calculator with a lid in its closed position, embodying features of the invention.

FIG. 2 is front view of the calculator of FIG. 1, with the lid in a partially open position, the hinge portion connecting the lid to the calculator body being shown in a cutaway view, so the spring/damper mechanism can be seen.

FIG. 3 is a partially cutaway right side view of the calculator of FIG. 1 with the lid in a fully open position.

FIG. 4 is a left side view of the lid.

FIG. 5 is an enlarged front view of the cutaway portion of FIG. 2 showing a further embodiment of the spring/damper mechanism attached to the lid.

FIG. 6 is a side view of an embodiment of a spring holder.

FIG. 7 is a left end view of the spring holder of FIG. 6.

FIG. 8 is right end view of the spring holder of FIG. 6.

FIG. 9 is an end view of the spring.

FIG. 10 is an end view of the spring.

FIG. 11 is a further enlarged view of the left portion of the cutaway view of FIG. 5 showing the spring mechanism attached to the lid and calculator frame.

FIG. 12 is a further enlarged view of the right portion of the cutaway view of FIG. 5 showing the damper mechanism attached to the lid and calculator frame.

FIG. 13 is a side view of an embodiment of the damper.

FIG. 14 is a left end view of the damper of FIG. 13.

FIG. 15 is a right end view of the damper of FIG. 13.

FIG. 16 is a view from the right side of the calculator of FIG. 1 showing the retainer for the damper.

FIG. 17 is a cutaway side view of the retainer of FIG. 16 taken along line 17—17 of FIG. 16.

DETAILED DESCRIPTION

Figure 18:
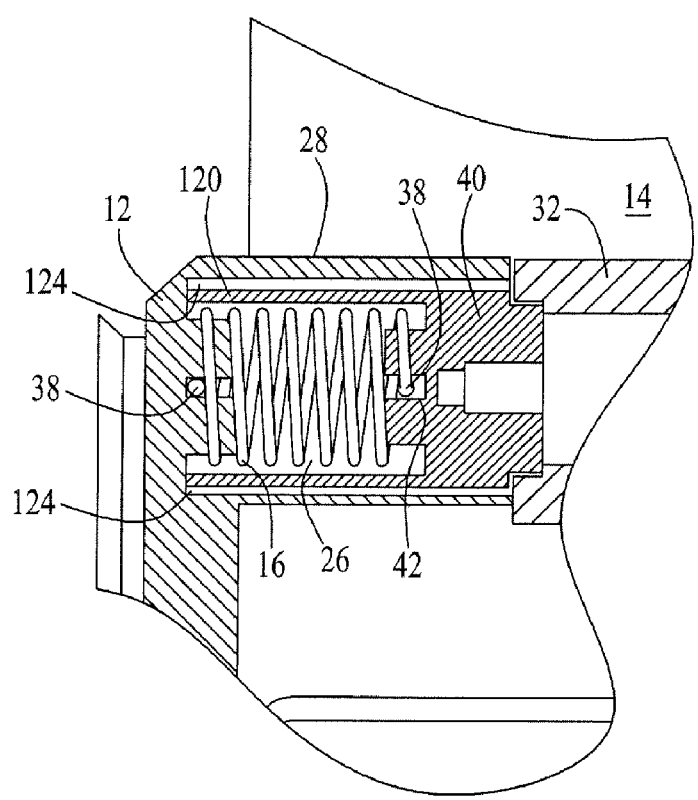
FIG. 18 is an enlarged view of the left portion showing a further embodiment with the drive spring and damper at one side of the calculator.

FIGS. 1–3 and 5 shows a portable, a hand-held calculator 10 including a generally flat and rectangular housing 12 and a lid or cover 14. The lid 14 is movable from a first position covering a portion of the front of the calculator, primarily a display screen, to an open position to the rear of the housing 12. The pivoting movement of the lid to its open position, as shown in FIG. 3, raises the top of the calculator 10 above a surface upon which the calculator is placed. The lid structure 14 is attached to the housing 12 by a hinge structure which includes a driving means, such as a coiled drive spring 16, and a damping means 18, such as a rotating drum 20. The spring 16 and damping means 18, in combination, drives the lid 14 from its closed position, as shown in FIG. 1, to its open position at a predefined speed. The damping means 18 prevents the lid 14 from rapidly snapping open as it would if driven by the spring alone, which could possibly damage the calculator. Also, when the calculator rests on a surface, the opening lid serves to raise the top end of the calculator off the surface, thus orienting the calculator in a more ergonomic orientation for use.

In a preferred construction, as best shown in FIGS. 2, 5, 11 and 12, the top end of the calculator frame 12 has left and right inwardly facing extension 28, 30, the extensions enclosing a second cylindrical hollow cavity 26 and first cylindrical hollow cavity 22, respectively. The first cylindrical hollow cavity 22 and the second cylindrical hollow cavity 26 share a common central axis. The lid has a centrally located cylindrical portion 32 that is adapted to be connected to the spring 14 and the rotatable drum 20. The central cylindrical portion 32 of the lid 14 also shares the same common central axis.

The spring 16 is located in the second cylindrical hollow cavity 26 in the top end of the housing 12. An inner end 34 of the spring 16 is attached to the bottom of the cavity 26 to prevent the inner end 34 of the spring 16 from rotating within the cavity. Attachment within the cavity may be accomplished by various different means. One preferred method is the use of a slot 36 in the bottom surface of the hollow cavity 26 sized to receive a transverse portion 38 of the spring. Other techniques include adhesive attachment or molding into or attaching the spring directly to a metal of plastic plug, which may be wedged into or attached to the bottom end of the cavity. The other end of the coil spring 16 is then attached to the centrally located cylindrical portion 32 of the lid 14. The attachment may be directly to the cylindrical portion 32. An alternative means of attachment is a cap 40 such as best shown in FIGS. 5–8 and 11. The particular cap 40 has a groove 42 on a first end thereof sized to receive a second traverse portion 38 on the second end of spring 16. In the particular embodiment shown, the cap 40 also has an extension 44 on its second end. The extension 44 has a cross sectional shape to fit in a similar sized and shaped hole 46 on the end of the cylindrical portion 32. The cross sectional shape may be round, or non-round, i.e. oval, triangular, square, etc. so that when the extension 44 is placed in the similar shaped hole 46 the extension 44 will not rotate within the hole 46. As shown in FIG. 8, the extension 44 is 6-sided and the hole 46 is similarly shaped. The extension 44 may be adhesively secured or press fit into the hole 46 to assure that, once assembled the spatial relationship between the extension 44 and the hole 46 is fixed. As a result of such an arrangement, when the lid is released from its closed position the second end of the tensioned spring rotates causing the lid to the same extent.

For proper functioning of the inventive design it is not necessary that the cap 40 have an extension 44 which is inserted in a hole in the cylinder 32. For example, one skilled in the art would recognize that an equivalent construction has an extension located on the end of the cylinder, with that extension being inserted in a hole in the cap 40. One skilled in the art will also recognize that there are numerous alternative ways of attaching a spring retaining cap to the cylindrical portion 32 of the lid 14.

Several different damping means can be provided. A first embodiment of the damping means utilizes a rotatable drum 20 placed within a first cylindrical hollow cavity 22 in the top end of the housing 12. A circumferential space 24 between the outer wall of the drum 20 and the wall of the first cylindrical hollow cavity 22, best seen in FIG. 12, is filled with a viscous material such as a silicone oil, viscous grease or a gel. Alternatively, this space can be filled with other materials that create friction between the surface of the outer wall of the drum 20 and the inner wall of the cavity 22 to retard its rotation within the first cylindrical hollow cavity 22. While the first end of the drum 20 is free to rotate within the cavity 22, the other end of the damping means is attached to the cylindrical portion 32 of the lid. Numerous attachment means can be used including those described above regarding the spring retaining cap 40. However, it is also desirable that the drum be more permanently secured to the cylindrical portion of the lid. Therefore, it may be adhesively secured, press fit or formed as an integral extension of the cylindrical portion 32 of the lid 14. FIGS. 2, 5 and 12 show the drum 20 to be secured within a hole in the end of cylinder 32 with an extension 144 similar in Shape to the extension 44 on cap 40.

While the spring and damping drum which comprise the driving means are shown to be located in left and right hollow cavities in the calculator housing, the invention contemplates that their locations can be reversed or both can be located in a single hollow cavity on one side of the housing, such as in the left side of the housing as shown in FIG. 18. The assembly can be alternatively located on the right side of the housing. This embodiment includes a drum 120 as an extension of the retaining cap 40. The drive spring 16, located within a hollow in the center of the drum 20 is attached to both the calculator housing 12 and the cap 40 in the manner as described above. Also, in a like manner, a viscous material is located in the space 124 between the outer wall of the drum 120 and the housing 12. The other end of the lid, the right side in this instance, can be rotatably mounted to the housing by any manner of pivot known to the art. It is also contemplated that two such assemblies can be used with one spring/damper combination in the first cylindrical cavity 22 and the second spring/damper combination in the second cylindrical cavity 26.

The calculator housing also includes a latching mechanism 58 to hold the lid in its first position, such as shown in FIGS. 1 and 2, covering a portion of the face of the calculator until the operator desires to open the lid. The latching mechanism 58 includes a lip which interacts with the edge of the lid 14 in its closed position and a tensioning spring 62 which biases the lip 60 to its latching mode. Pulling downward (the direction of the arrow in FIG. 1) on the latching mechanism 58, compresses the tensioning spring 62, retracts the lip, releasing the lid 14 so it can be driven open by drive spring 16. While the latching mechanism 58 is shown located on the face of the calculator one skilled in the art will recognize that it can be located in numerous different positions such as to the side of the lid rather than below the lid front edge. Alternatively, it can be located at the bottom end of the first or second hollow cavity 22, 26 so as to interlock with the damping drum or lid cylindrical portion 32 in its closed orientation.

In assembling the lid 14 to the calculator housing 12 the viscous oil, grease or gel is inserted in the hollow cavity 22, the spring and damping mechanism are placed in the hollow cavities 22, 26, the spring 16 and damping drum 20 being attached to the lid 14 with the lid in its closed, first configuration with the spring tensioned to an extent that the lid will be driven to its desired open position within a desired opening time period. The order of assembly depends on the particular construction of the components and the appropriate order for easy of assembly. Once the components are assembled, a retainer 70 is placed over the right side of the calculator with pins 72 inserted in receiving holes 74 in the retainer. A retention cylinder 76 on the top of the retainer 70 fits within a like sized opening in the frame used to insert the drum 20, retaining the drum 20 and viscous material in the first hollow cavity 22. The pins 72 are then flattened, locking the retainer 70 to the housing 12. To close the lid one merely rotates it upwardly and forward, retensioning the drive spring 16, until the lid 14 edge is captured under the lip 60.

The above described lid and opening mechanism can be applied to various calculators' designs which are well known to those skilled in the art. However, the inventive lid is not limited to covering just the display on calculators but may also be applied to cover other operative features of the calculator such as some or all of the data entry buttons on face of the calculator. In its open position, it is also not necessary that the lid rotate about 270° to a position approximately perpendicular to the back of the calculator. The assembly can be designed to rotate the lid so the lid rests against the back of the calculator or to rotate to less than to a rearwardly perpendicular position if so desired by tensioning the drive spring 16 a greater or lesser amount and providing mechanical stops 64 to limit the rotation of the lid 14. It is also contemplated that the lid and spring/damping mechanism can be applied to other electronic devices such as portable phones, pagers, hand held computers, data storage devices, electronic writing pads, compact disk display devices, sound recorders and audio and video player systems or non-electronic devices such as note pads, photo display collections and battery powered light sources. Accordingly, the invention described herein is not contemplated to be limited a particular application but is instead directed to a readily openable lid having a damped spring drive mechanism for protecting the operative surface of a device or display.

What is claimed is:

1. A device sufficiently small to use upon a desktop, comprising:
 a housing for operative components, said housing including cylindrical cavities sharing a common central axis,
 a lid structure including a cover portion with a hinge portion formed along one edge of said lid structure, the hinge portion sized to extend between and into said cylindrical hollow cavities in the housing,
 the lid structure pivotally connected to a rotational drive mechanism located in at least one cylindrical hollow cavity of the housing, the rotational drive mechanism including a drive spring and a damping means sharing a central axis with the lid structure, wherein the rotational drive mechanism effectuates a controlled pivotal motion of said lid structure, biasing said lid structure from a closed position covering some or all of said operative components to an open position where some or all of the operative components are exposed, and wherein the drive spring is located in a first cylindrical cavity with one end of the spring attached to the housing and the other end of the spring attached to the lid, and the rotational damping means is positioned within a second cylindrical cavity.

2. The device of claim 1, having operating electronics enclosed within the housing, the operative components comprising an array of actuating buttons and a display panel being located on a front surface of said housing proximate said array of actuator buttons.

3. The device of claim 1, selected from the group consisting of a calculator, portable phone, pager, hand held computer, data storage device, electronic writing pad, compact disk display device, sound recorder, audio and video player systems, note pads, photo display collections and battery powered light sources.

4. The device of claim 1, wherein the viscous liquid comprises a silicone oil, grease or gel.

5. A device sufficiently small to use upon a a desktop, comprising:

a housing having operative components, said housing including first and second cylindrical hollow cavities, said cylindrical hollow cavities sharing a common central axis, a lid structure pivotally connected to a rotational drive mechanism, said lid structure including a cover portion with a hinge portion formed along one edge of said cover portion, the hinge portion extending between said first and second cylindrical hollow cavities and intersecting the common central axis, and said rotational drive mechanism, comprising
- a drive spring located in a first cylindrical hollow cavity with one end of the spring attached to the housing and the other end of the spring attached to the lid, and
- a damping means positioned within a second cylindrical hollow cavity, the damping means comprising a rotatable drum and a viscous liquid interposed between the outer surface of the rotatable drum and the inner surface of the second cylindrical hollows cavity, said rotatable drum having an outer diameter substantially equivalent to the inner diameter of the second cylindrical hollow cavity, wherein the rotational drive mechanism effectuates a controlled pivotal motion of said lid structure, biasing said lid structure, from a closed position covering some or all of said operative components to an open position where some or all of the operative components are exposed.

* * * * *